June 30, 1936. L. GOTTLIEB 2,046,159
AUXILIARY TREAD FOR PNEUMATIC TIRES
Filed Oct. 23, 1933
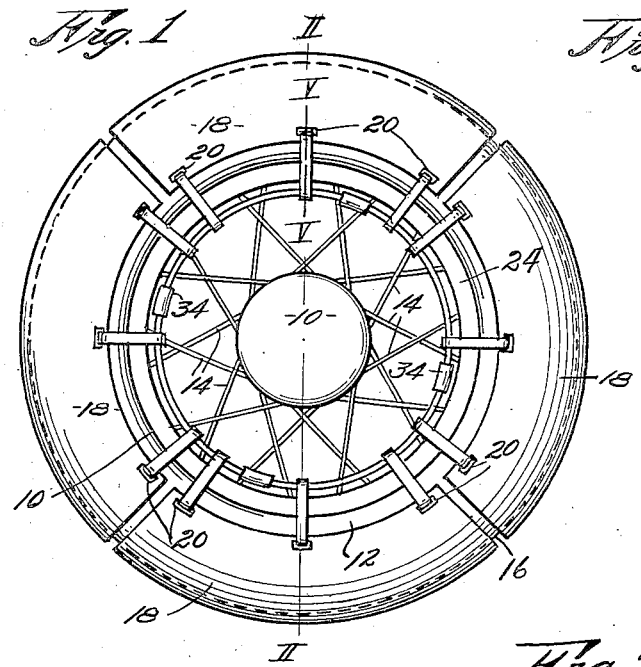
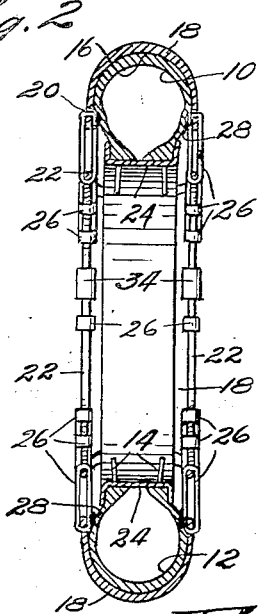
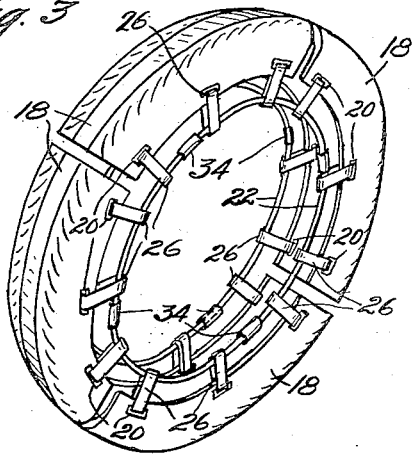
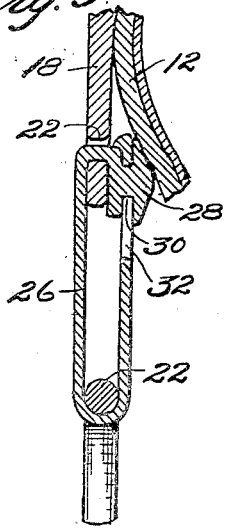
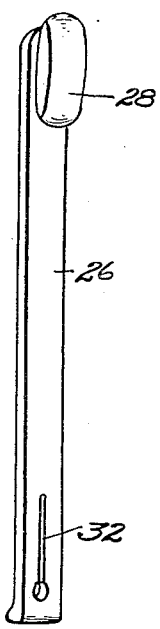
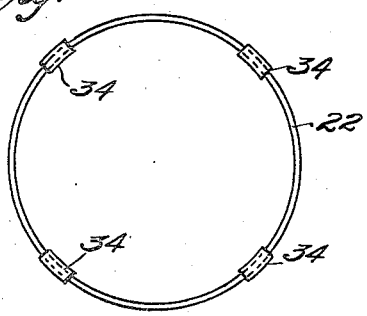
INVENTOR,
Louis Gottlieb.
BY
Hovey F. Hamilton,
ATTORNEYS.

Patented June 30, 1936

2,046,159

UNITED STATES PATENT OFFICE 2,046,159

AUXILIARY TREAD FOR PNEUMATIC TIRES

Louis Gottlieb, Kansas City, Mo.

Application October 23, 1933, Serial No. 694,817

1 Claim. (Cl. 152—17)

This invention relates to auxiliary treads for pneumatic tires.

The principal object of this invention is the provision of a simple, inexpensive and easily adjusted auxiliary tread for pneumatic wheels, wherein a series of segmental auxiliary tread members is adapted to be positioned on the wheel tire and secured thereto by means of resilient links connected thereto and engaging a floating ring at each side of the wheel.

A further object of the invention is the provision of series of segmental tread members adapted to be fitted on the pneumatic tire of the wheel in spaced-apart relation and secured in position to rigid ring members spaced-apart from the wheel, by means of resilient connecting members.

Other objects of the invention is the provision of an auxiliary tread for penumatic tires which may be used to cover all or any portion of the tire tread, to serve as a tire protector, or as an anti-skid device.

Minor objects will appear during the course of the specification, referring to the drawing, wherein:

Figure 1 is a side elevation of a pneumatic wheel whereon is mounted an auxiliary tread embodying this invention.

Fig. 2 is a central, sectional view, taken on line II—II of Fig. 1, with portions of the wheel omitted for clearness.

Fig. 3 is a perspective view of the auxiliary tread members, with securing means detached from the wheel.

Fig. 4 is an elevation of one of the ring members.

Fig. 5 is an enlarged fragmentary, sectional view taken on line V—V of Fig. 1, and, Fig. 6 is an enlarged, perspective view of one of the resilient attaching members shown in the stretched-out position.

In the drawing, like reference characters refer to similar parts, and the numeral 10 designates a wheel having a pneumatic tire 12. Wire spokes 14 are shown on wheel 10, however disk wheels, wood spoked wheels, etc. might be provided with these auxiliary treads since the fastening or securing means for the several tread members are positioned at opposite sides of the wheel, as hereinafter set forth.

The tread 16 of the tire oftimes becomes worn to such an extent that it is dangerous to use and it is desired to re-enforce it by an inexpensive means so that they may be used for a longer period without undue danger. This is accomplished by the use of auxiliary tread members 18, which are preferably made of segments of used tire casings of a size sufficient when positioned on the tire to extend over the tread and along each side thereof. Because of the fact that old used casings are always available and that they are inexpensive, they will be generally used, however, it is apparent that any arcuate segmental channel member would serve the same purpose.

Adjacent each edge of the tread segment 18 is a series of openings 20. A rigid ring member 22 is provided at opposite sides of the wheel. This ring may be circular, octagonal, or any other shape, it only being necessary that it have an open central portion to allow for its proper positioning about the hub and axle portion of the wheel structure. Ring member 22 is adapted to be positioned adjacent the rim 24 of the wheel and to be spaced-apart therefrom. Each of the segmental tread members is secured at its opposite sides to the respective adjacent ring by means of resilient attaching or interconnecting members 26 which are adapted to be formed into a loop which passes through openings 20 and around the body portion of ring member 22.

A sufficient number of these attaching members is provided to properly secure the auxiliary thread members in position. The number required will depend to some extent on the length of the tread segment used. Where very short segments are used only one attaching member at each side of the wheel will be necessary. In some instances only two tread segments will be used, then several attaching members may be used to secure each segment in position. Attaching member 26, as shown, is made of an elastic material such as rubber, and is provided at one end with a button member 28, integral with 26 and spaced-apart therefrom by neck 30. The opposite end of 26 is provided with a slit opening 32, through which button 28 is passed when the member is positioned as shown in Fig. 5. Preferably, the button connection is positioned on the inside adjacent the tire 10 where it will be out of view and protected from accidental unfastening.

When all the tread segments are connected to both rings 22 with the attaching members under tension, they will be held in proper operative position while the wheel is in use. Springs might be substituted for the rubber member 26, however, it is considered best to use non-metallic connectors, thereby eliminating possible rattling and rusting, which would be objectional.

When the device is in use there will be a resultant relative movement of the parts and especially the rigid ring member will have a tendency to strike the wheel. While the members 26 might eliminate, to a large degree, this possibility, however, it is deemed advisable to provide resilient buffers 34 positioned on rings 22 in spaced relation.

This buffer will not permit direct contact of the ring 22 with any part of the wheel structure. Ring 22 might be completely covered with a soft non-metallic material.

It is apparent that the invention as shown and described will function to effectually protect a worn tire or the tread sections may be so positioned in spaced-apart relation as to present a non-skid surface for an otherwise smooth tire surface. These auxiliary tread members are also servicable for protecting tire treads when driving over stony highways, where the tread is subjected to unusual and severe wear.

Having thus described the invention, what is claimed as new and desired to be secured by Letters Patent is:

An auxiliary tread for a wheel having a pneumatic tire, comprising a plurality of longitudinally and transversely arcuate segmental tread members adapted to be positioned longitudinally on said tire in spaced-apart relation and with opposite edges thereof extending inwardly at opposite sides of the wheel; each of said opposite edge portions having a plurality of openings formed therethrough; a rigid ring of uniform cross section at each side of the wheel and spaced-apart inwardly from the adjacent edges of said tread members; an elastic strap member passing through each of said openings and about said ring for free longitudinal movement therealong; each of said strap members having an integral button at one end thereof and a slit formed through the other end portion thereof and adapted to receive said button when the strap is in position to interconnect said tread member and ring, whereby said button is secured in buttoned position between said tire and tread member.

LOUIS GOTTLIEB.